United States Patent
Panunzio et al.

(10) Patent No.: US 11,499,461 B2
(45) Date of Patent: Nov. 15, 2022

(54) AFTER TREATMENT SYSTEM FOR A VEHICLE

(71) Applicant: CNH Industrial America LLC, New Holland, PA (US)

(72) Inventors: Salvatore Panunzio, Modena (IT); Luca Levato, Modena (IT); Daniele Dall'olio, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/274,173

(22) PCT Filed: Sep. 5, 2019

(86) PCT No.: PCT/EP2019/073666
§ 371 (c)(1),
(2) Date: Mar. 6, 2021

(87) PCT Pub. No.: WO2020/049085
PCT Pub. Date: Mar. 12, 2020

(65) Prior Publication Data
US 2021/0199038 A1    Jul. 1, 2021

(30) Foreign Application Priority Data

Sep. 6, 2018  (IT) .................... 102018000008393

(51) Int. Cl.
*F01N 3/20*  (2006.01)
*F01N 3/28*  (2006.01)

(52) U.S. Cl.
CPC ......... *F01N 3/2066* (2013.01); *F01N 3/2889* (2013.01); *F01N 3/2892* (2013.01); *F01N 2240/02* (2013.01); *F01N 2240/20* (2013.01); *F01N 2260/08* (2013.01); *F01N 2590/08* (2013.01); *F01N 2610/02* (2013.01)

(58) Field of Classification Search
CPC combination set(s) only.
See application file for complete search history.

(56) References Cited

U.S. PATENT DOCUMENTS 10,612,442 B2 *  4/2020  Boldt ..................... F01N 13/00
2014/0334987 A1 * 11/2014  Stanavich ............... F01N 3/106
                                                       422/168

(Continued)

*Primary Examiner* — Binh Q Tran
(74) *Attorney, Agent, or Firm* — Rickard K. DeMille; Rebecca L. Henkel

(57) ABSTRACT

An after treatment system (ATS) for a vehicle includes, fluidly connected in series, an inlet, a urea mixer and an outlet. The inlet is fluidly connected to an output of an engine of the vehicle and the outlet is fluidly connected to an outlet tube of the vehicle. The urea mixer is provided with a dosing module, an inner element and an outer element. The inner element is configured such that a first flow of exhaust gas flow flowing from the inlet into the urea mixer flows into an first volume defined by the inner element. The outer element is configured such that a second flow flows in a volume defined between inner element and outer element, wherein the first and second flows rejoin together in a mixing chamber fluidly connected to the volume and to the first volume downstream with respect inner and outer elements.

13 Claims, 7 Drawing Sheets

(56) References Cited

U.S. PATENT DOCUMENTS

| | | | |
|---|---|---|---|
| 2016/0069239 A1* | 3/2016 | Freeman | F01N 3/2892 60/324 |
| 2016/0131007 A1* | 5/2016 | Kauderer | F01N 13/0097 422/177 |
| 2016/0184783 A1* | 6/2016 | Tyni | B01F 5/0602 422/169 |
| 2017/0342888 A1* | 11/2017 | Noren, IV | B01F 3/04049 |

\* cited by examiner

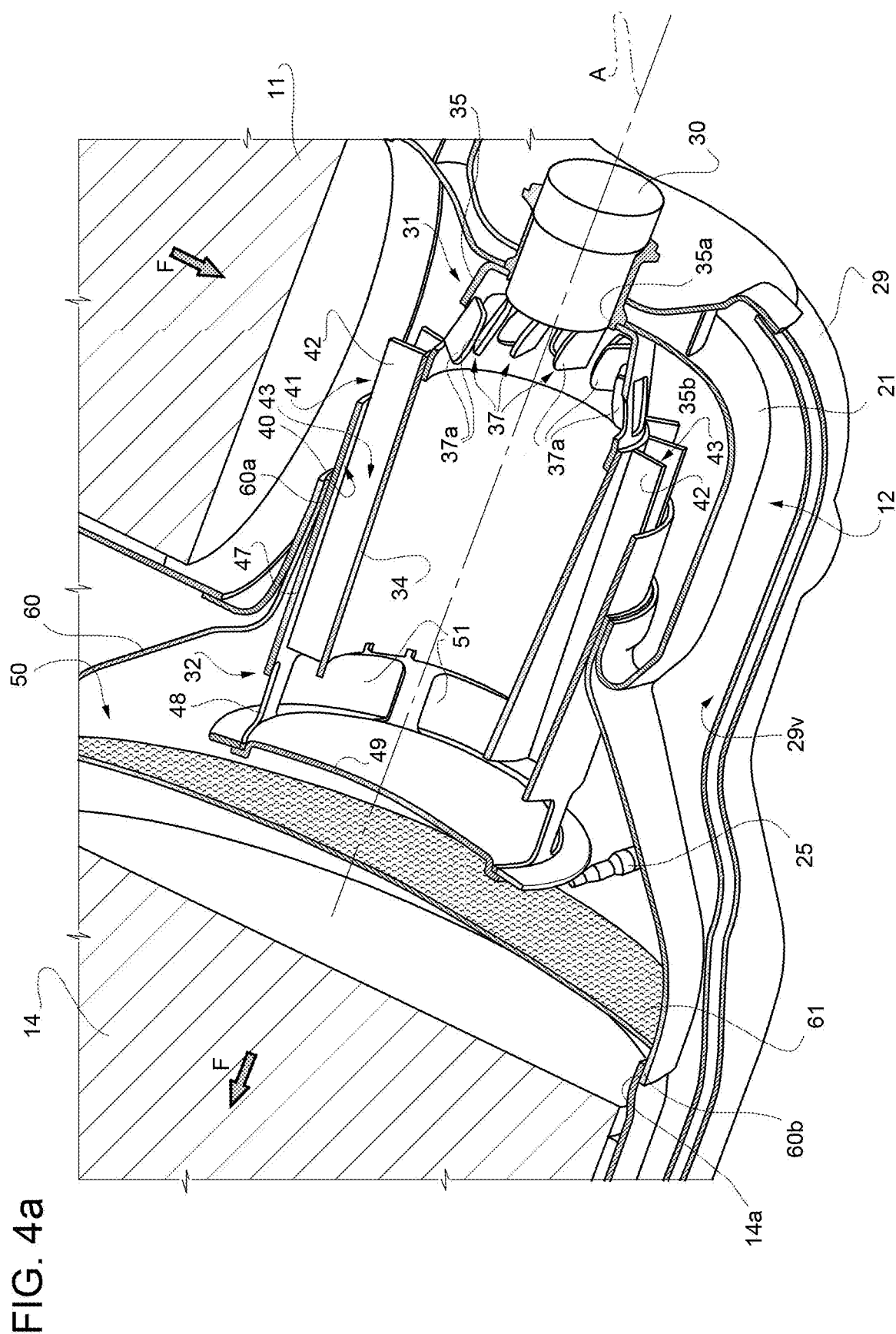

AFTER TREATMENT SYSTEM FOR A VEHICLE

CROSS REFERENCE TO RELATED APPLICATIONS

This application is a U.S. National Stage filing of International Application Serial No. PCT/EP2019/073666 entitled "IMPROVED AFTER TREATMENT SYSTEM FOR A VEHICLE," filed Sep. 5, 2019, which claims priority to Italian Application Serial No. 102018000008393, filed Sep. 6, 2018, each of which is incorporated by reference herein in its entirety for all purposes.

TECHNICAL FIELD

The present invention concerns an after treatment system for a vehicle, in particular an improved after treatment system for exhaust gas of a vehicle, in particular of a work vehicle.

BACKGROUND OF THE INVENTION

Diesel vehicles, in particular easy and work vehicles, need to treat exhaust gases coming from the engine before their emission in the environment in order to decrease level of pollute elements such as nitrogen oxide or particulate.

In order to achieve such treatment, it is known to use systems known as After Treatment Systems (ATS) comprising a series of elements such as Diesel Oxidation Catalysts (DOC), Urea (i.e. AdBlue® urea solution) Injection Module, Diesel Particulate Filters (DPF) or Selective Catalytic Reduction (SCR); this latter may comprise more intermediate elements such as SCRoF (Selective Catalytic Reduction on Filter) and SCR-CUC (Clean Up Catalyst).

An example of such system is shown in FIG. 1; as disclosed, a known ATS 1' may comprise an inlet 2', the DOC module 3', the Urea Injection Module 4' and SCR systems 5' and the outlet 6', fluidly connected in series. In such systems it is essential to provide a correct mixing between urea (injected through dosing modules) and exhaust gases flow flowing out from DOC module before its passage into SCR in order to generate a gas mixture which allows the correct execution of reduction chemical reactions of the nitrogen oxide contained in exhaust gases.

To obtain the above described mixing of urea and exhaust gases it is known to provide after treatment systems which has a great linear extension, as the one disclosed in FIG. 1, and in which urea injection module comprises an inclined dosing module which inject urea solution in a long mixing conduit. Such conduit is long to provide a volume which is big enough to guarantee a correct mix of the exhaust gases with the urea solution. However, such long conduit increases the encumbrance of ATS in the vehicle.

To solve the aforementioned problem, it is possible inject urea at higher pressure into the exhaust gas flow; this allows to use shorter mixing conduits, however high pressure urea dosing modules are more expensive and need peculiar urea feeding circuits which are more expensive and prone to breakage than "standard" dosing module (at lower pressures) and related circuit.

A correct mixing of urea solution into exhaust gases is essential, otherwise urea could crystallize on inner walls of conduit of the ATS; this drawback generates from the fact that the injected urea is at environment temperature, i.e. about 25° C., while the exhaust gas is at a temperature of at least 300° C.

In view of the above, it is essential to avoid an excessive loss of temperature in the mixing module because, first, the efficiency of chemical reduction reactions is decreased and further because the possibility of formation of ammonia crystal is reduced at high temperature. Again, the presence of a long linear mixing conduit introduces a significant drop of temperature of exhaust gases.

Moreover, a long mixing conduit as the above described one increases the pressure drop between inlet and outlet of the ATS while it is necessary to have a minimal pressure drop OF ATS to improve engine efficiency.

Therefore, the need is felt to provide an ATS which allows a correct mixing of urea solution with the exhaust gas flow, which is compact, which does not rise manufacturing costs and which does not increase the standard pressure drop between inlet and outlet of the ATS.

An aim of the present invention is to satisfy at least one of the above mentioned needs.

SUMMARY OF THE INVENTION

The aforementioned aim is reached by an ATS as claimed in the appended set of claims.

BRIEF DESCRIPTION OF DRAWINGS

For a better understanding of the present invention, a preferred embodiment is described in the following, by way of a non-limiting example, with reference to the attached drawings wherein:

FIG. 4a is a perspective section view of a portion of the ATS of FIG. 3;

DETAILED DESCRIPTION OF THE INVENTION

The present description has been directed to an agricultural vehicle comprising an ATS according to the present invention, merely for sake of example. However, it is clear that such example is non limitative and that the ATS according to the present invention may be applied to other typologies of vehicles.

Figure 1:
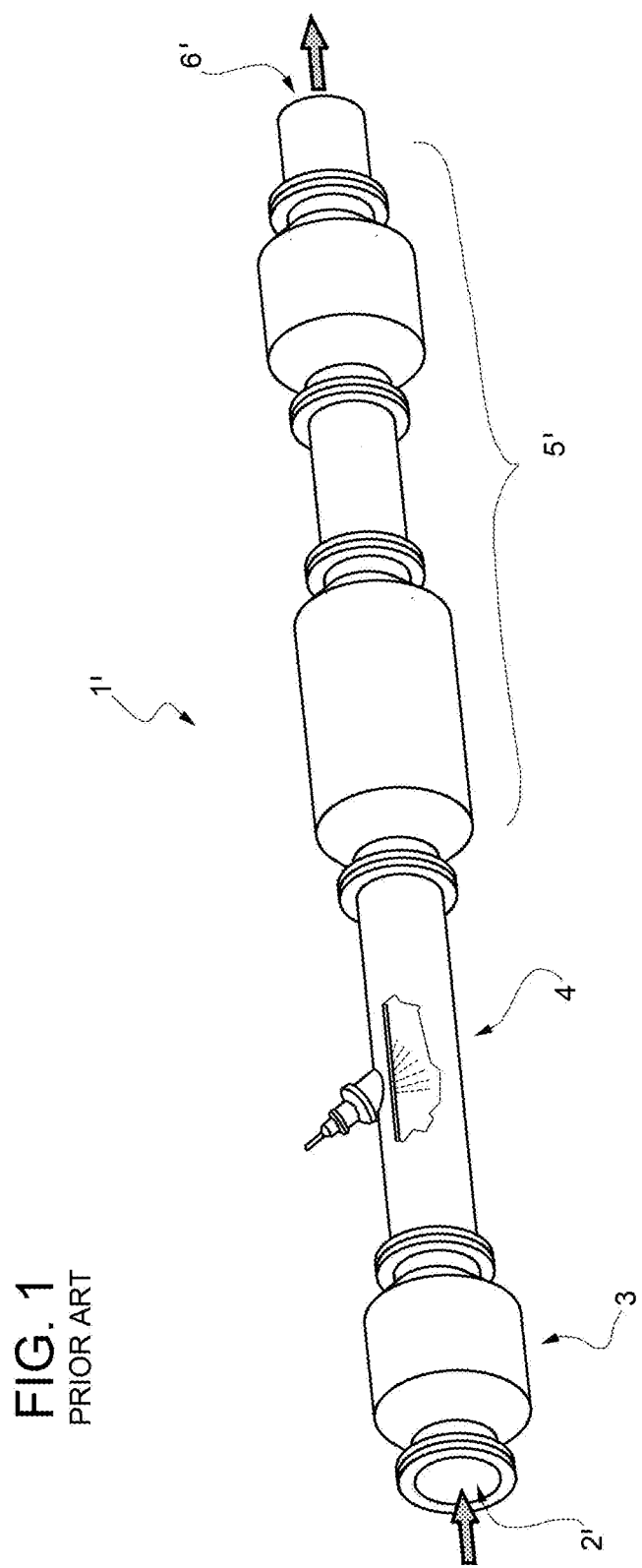
FIG. 1 is a schematic perspective view of an ATS as known in the art.
Figure 2:
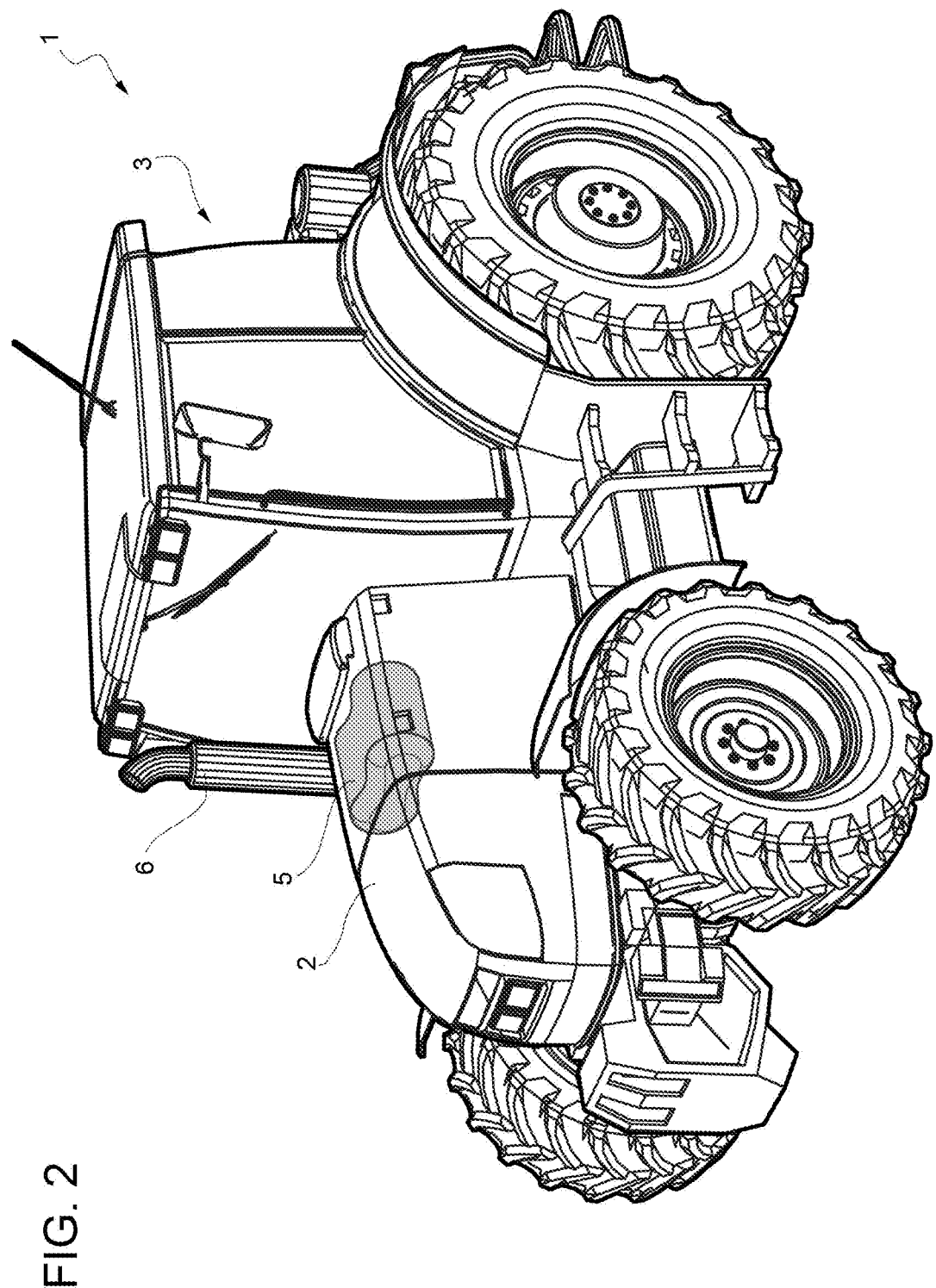
FIG. 2 is a perspective view, with parts removed for sake of clarity, of a vehicle comprising a ATS according to the present invention.

FIG. 2 discloses an agricultural vehicle 1 of known typology, e.g. a wheeled tractor, comprising, just above the motor (not shown) which is housed in an anterior portion 2 of cab 3, an ATS module 5 according to the present invention. ATS is fluidly connected, as known, to an outlet of the engine of vehicle 1 and to an outlet tube 6.

Figure 3:
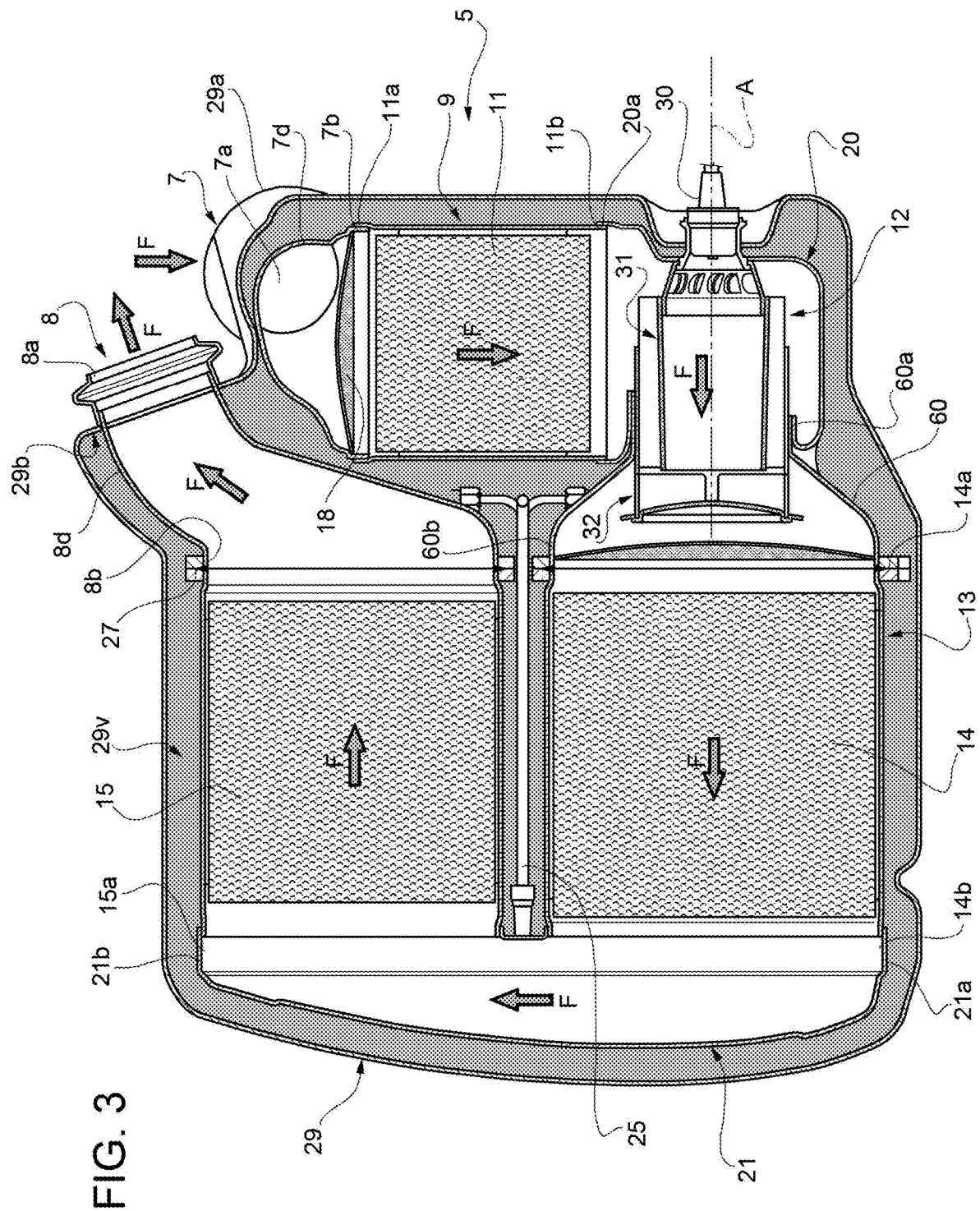
FIG. 3 is a longitudinal section view of an ATS according to the present invention.

As shown in greater detail in FIG. 3, ATS 5 comprises an inlet 7, fluidly connectable to the output of the engine of the vehicle, and an outlet 8, fluidly connectable to the outlet tube 6 of the vehicle and an ATS 9, fluidly interposed between inlet 7 and outlet 8, which may comprise, fluidically connected in series from inlet 7 to outlet 8, a DOC 11, a urea mixer 12, an catalysts module 13 comprising a SCRoF 14 and a SCR-CUC 15.

In particular, inlet 7 may be realized as an inlet duct 7*d* which is coupled to DOC 11 so as to be fluidly connected this latter. For sake of example, duct 7*d* comprises a first opening 7*a*, fluidly connected to engine output and second opening 7*b* fluidly connected to an inlet 11*a* of DOC 11. In the described example the portion provided with second opening 7*b* is fitted inside inlet 11*a* of DOC 11. ATS 9 may further comprise, carried by either inlet 7 or DOC 11 a first perforated plate 18, which is therefore fluidly interposed to flow F of exhaust gases.

Such flow F coming from inlet 7 to DOC 11 may be inserted in ATS 9 with any direction, i.e. any angle may be provided between inlet 7 and DOC 11; in the described example inlet 7 is substantially perpendicular to DOC 11. Exhaust gas flow F passes through first perforated plate 18 into DOC 11 and then flows into mixer 12 as greater described in detail further below.

In particular an outlet 11*b* of DOC 11 is fluidly connect to an inlet 20*a* of a fitting 20 which encloses mixer 12. In particular fitting 20 is fitted externally into DOC 11. It should be noted that mixer 12 is perpendicular with respect to flow F, which therefore deviate with respect to the direction had in DOC 11 before entering in the catalysts module 13.

Once coming out from mixer 12, flow F passes through SCRoF 14 and, then, through a fitting 21 configured to fluidly connect SCRoF 14 and SCR-CUC 15. Fitting 21 has a shape configured to invert flow F direction, i.e. making a turn of around 180°, into SCR-CUC 15 with respect to SCRoF 14. In this way, SCR-CUC 15 is placed parallel side to side with respect to SCRoF 14.

Fitting 21 may be realized as a "cup" shaped tube having an inlet 21*a* and an outlet 21*b*; these latter are dimensioned so as to coupled respectively with the outlet 14*b* of SCRoF 14 and with the inlet 15*a* of SCR-CUC 15. In particular outlet 14*b* and inlet 15 of SCR subsystems may be fitted externally or internally to inlet 21*a* and outlet 21*b* of fitting 21.

Outlet 8 may be realized as an outlet duct 8*d* which is coupled to SCR-CUC 15 so as to be fluidly connected this latter to outlet tube 6. In the described example, duct 8*d* is coupled to a supporting wall of SCR-CUC 15 via a flanged connection as described in the following and comprises an opening 8*a*, fluidly connected to output tube 6.

As clearly shown in FIG. 3, flow F describes into ATS 9 a substantially squared path in which both inlet 7 and outlet 8 are at the same vertex of such path.

The described layout of module 5 may be varied in a modular way in order to be used for motors having a different displacement. Greater displacement implies a greater emission of exhaust gases and a proportional request of chemical reduction reactions in DOC 11 and catalysts module 13. Such increased demand of performances of DOC 11 and catalysts module 13 may be achieved by increasing the diameter or the length of such elements.

Duct 7*d*, 8*d* and fittings 20, 21 are configured to be used also in the case of different length of DOC 11 and catalysts module 13, if diameter is constant; in this way ATS module 5 may be modifies in a modular way to adapt to a different displacement engine. In fact, the same structure and element, with few modification, i.e. simply the substitution of DOC 11 and catalysts module 13, may be used for a great variety of engines.

ATS module 5 further comprises a plurality of sensors configured to detect a plurality of chemical and thermodynamic properties of flow F flowing in ATS 9. For sake of example nitrogen oxide sensors or pressure and temperature sensors may be provided and connected to a electronic unit, for example an ECU, (not shown) of vehicle 1 to control the operation of ATS elements.

ATS module 6 may further comprises a flange 27 configured to support DOC 11 and catalysts module 13 modules and to couple these latter to the adjacent fittings 21 and ducts 8*d*, 60.

In particular, flange 27 may connect together a mixing duct 60 (described below in detail) connected to fitting 20 and surrounding part of injection module 12 with an inlet 14*a* of SCRoF 14 and an inlet 8*b* of duct 8*d* with outlet 15*b* of SCR-CUC 15. Flange 27 is moreover configured to connect together supporting walls of catalysts module 13 subsystems so as increase the rigidity of ATS 9.

ATS module 5 advantageously comprises an housing 29 comprising a plurality of walls defining an inner volume 29*v* into which ATS 9 may be housed in its entirety. Housing 29 is obviously provided with two openings 29*a* for inlet 7 and 29*b* for outlet 8 of ATS 9. ATS module 6 may be also provided, between walls of housing 29 and ATS 9, of thermal insulating elements (not shown), so as to reduce the heat dispersion from ATS 9 to the environment. Such thermal insulating elements may comprise thermal insulating wool which fills the space between walls of housing 29 and ATS 9 or any other typology of known thermal barriers.

Making reference to FIG. 4, mixer 12 will be described hereinafter in greater detail.

Mixer 12 comprises a dosing module 30, preferably a 5 bar dosing module, for injecting urea solution into ATS 5. Dosing module 30 may be carried by fitting 21 and/or housing 29 and it may be positioned orthogonally, on an axis A, with respect to the direction of flow F at outlet 11*b* of DOC 11.

Mixer 12 further essentially comprises an inner element 31, preferably coaxial with respect to dosing module 30, and an outer element 32 placed externally with respect to inner element 31. Inner element 31 and outer element 32 may be carried by respective portions of fitting 21 and have a length lower than 200 mm, preferably 160 mm and a diameter lower than 100 mm, preferably about 98 mm diameter of element 32 and 70 mm the diameter of element 31.

In particular, inner element 31 and outer element 32 are annular axisymmetric elements; preferably they are substantial cylindrical elements and are partially interposed in radial direction one respect the other so that a portion of inner element 31 is not covered by outer element 32 and a portion of outer element 32 does not surround a portion of inner element 31.

Inner element 31 comprises a cylindrical portion 34 extending for at least two-thirds of its length and a terminal portion 35, connected to cylindrical portion 34 and preferably having a truncated-cone shape. Terminal portion 35 and cylindrical portion 34 are preferably monolithic or split, thereby delimiting an inner volume 38 and may be realized in metal. Terminal portion 35 is carried by fitting 21, eg. by screws.

Terminal portion 35 comprises an opening 35*a*, realized on an upper surface of portion 35 and configured to allow a partial housing on dosing module 30 through this latter and at least one opening 35*b* provided on the lateral portion of terminal portion 35 configured to allow the passage of a portion F1 of exhaust gases internally with respect to inner element 31 while a complementary portion F2 of exhaust gases flows between inner element 31 and outer element 32, as described in detail in the following.

The at least one opening 35b is dimensioned so that flow F1 is preferably 35-45%, in particular 40%, of total flow F and consequently flow F2 is 65-55%, in particular 60% of total flow F.

Advantageously, terminal portion 35 comprises a plurality of openings 35b equally spaced circumferentially around axis A and having a preferable substantially rectangular, more preferable squared, shape. In greater detail, an edge of each opening 35b comprises a protrusion 37 extending into inner volume 38 defined by inner element 31 and configured to generate a swirl to the air flow F1 coming from DOC 11. Preferably protrusion 37 is a plate element 37a extending from a lateral edge of the respective opening 35b and having a peculiar inclination, in particular comprised between 35° and 45°, preferably 40°. Preferably protrusion 37 are aligned so as to generate a clock-wise swirl.

Advantageously plate element 37a has the same shape of opening 35b and may be obtained by cutting three edges of such shape and bending the plate element 37a about the reaming edge inside volume 38.

Cylindrical portion 34 comprise a plurality of heat exchanger 41 extending from external lateral surface into a lateral volume 40 defined between inner element 31 and outer element 32 towards outer element 32 and configured to transmit heat from gas flowing in flow F2 towards inner volume 38 of inner element 31. Preferably heat exchangers 41 comprises at least a fin 42 which may be realized of every shape.

According to the preferred embodiment of FIG. 4, heat exchanger 41 comprises a plurality of fins 42 which are realized as linear walls equally spaced circumferentially around axis A and extending along all the length of cylindrical element 34. Fins 42 extend perpendicularly from lateral surface of element 34 so as to preferably touch outer element 32 defining in this way a plurality of channels 43 in which flow F2 is divided.

Figure 5D:
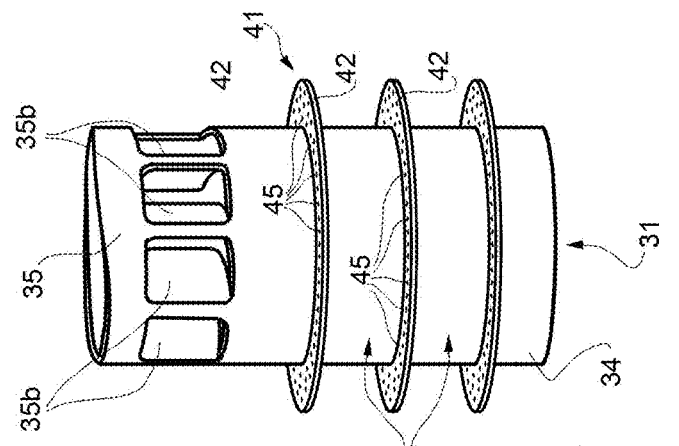
FIGS. 5a, 5b, 5c and 5d are perspective views of different embodiments of an element of the ATS of FIG. 3.
Figure 5C:
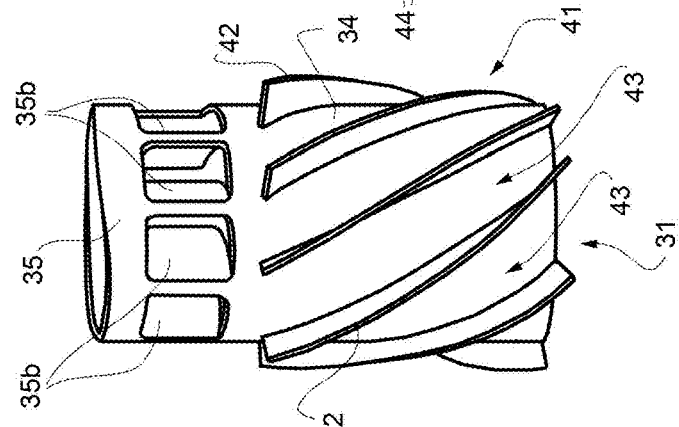
Figure 5B:
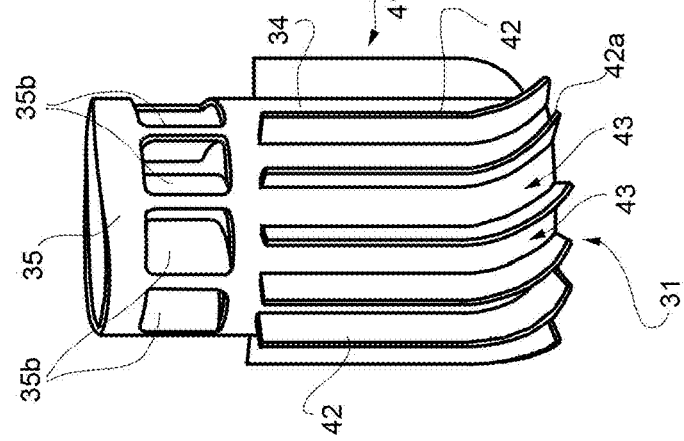
Figure 5A:
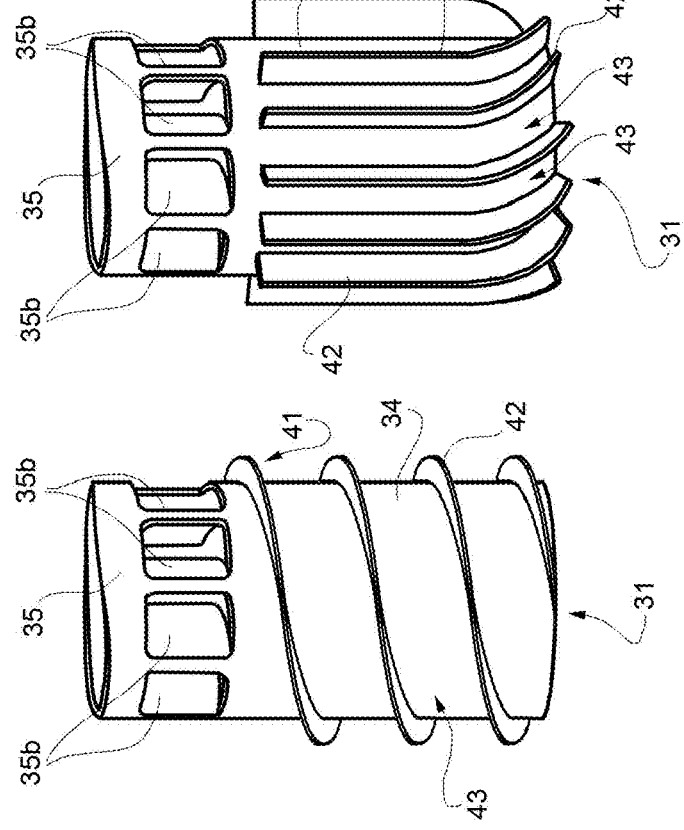

According to a first alternative embodiment, disclosed in FIG. 5a, heat exchanger 41 comprises a single fin 42 extending in spiral way along all the length of cylindrical element 34. Fin 42 extends perpendicularly from lateral surface of element 34 so as to touch outer element 32 defining in this way a single channel 43 making a plurality of turns around axis A.

According to a second alternative embodiment, disclosed in FIG. 5b, heat exchanger 41 comprises a plurality of fins 42 which are realized as linear walls equally spaced circumferentially around axis A and extending along all the length of cylindrical element 34. Fins 42 extend perpendicularly from lateral surface of element 34 so as to touch outer element 32 defining in this way a plurality of channels 43 in which flow F2 is divided. A terminal portion 42a of fins 42, opposite to terminal portion near to terminal portion 35 of inner element 31, is bended so as to curve channels 43 in order to generate a swirl, preferably opposite to the swirl generated inside volume 38.

According to a third alternative embodiment, disclosed in FIG. 5c, heat exchanger 41 comprises a plurality of fins 42 which are realized as linear walls equally spaced circumferentially around axis A and extending along all the length of cylindrical element 34. Fins 42 extend perpendicularly from lateral surface of element 34 so as to touch outer element 32 defining in this way a plurality of channels 43 in which flow F2 is divided. Fins 42 are bended spirally along all length of cylindrical portion 34 in order to provide a plurality of swirling channels 43 in which flow F2 is divided, configured to generate a swirl, preferably opposite to the swirl generated inside volume 38.

According to a fourth alternative embodiment, disclosed in FIG. 5d, heat exchanger 41 comprises a plurality of fins 42 which are realized as linear walls equally spaced axially around axis A and extending along all the circumference of lateral surface of cylindrical portion 34. Fins 42 extend perpendicularly from lateral surface of element 34 so as to touch outer element 32 defining in this way a plurality of chambers 44 through which flow F2 has to pass. Walls of fins 42 further comprises a plurality of openings 45 configured to allow the passage of flow F2 through each wall.

Outer element 32 comprises a cylindrical portion 47, surrounding a portion of cylindrical portion 34 of inner element 31 and cooperating with heat exchanger 41 as descried above, and a terminal portion 48, placed opposite with respect to terminal portion 35 of inner element 31 in the zone in which outer element 32 is not surrounding cylindrical portion 34 of inner element 31. Terminal portion 48 and cylindrical portion 47 are preferably monolithic and are realized in metal. Cylindrical portion 47 is carried by fitting 21, eg. by fitting.

Terminal portion 48 is preferably cylindrical and may be a continuation of cylindrical portion 47 and comprises a terminal plate 49 which is perpendicular to lateral wall of terminal portion 48 and which is preferably fixed to this latter, e.g. by screw. Terminal portion 48 further comprises at least one opening 51 configured to allow flows F1, coming from inner volume 38, and flow F2 passing through heat exchanger 41 to flow in a mixing chamber 50 as described in detail in the following.

Figure 4B:
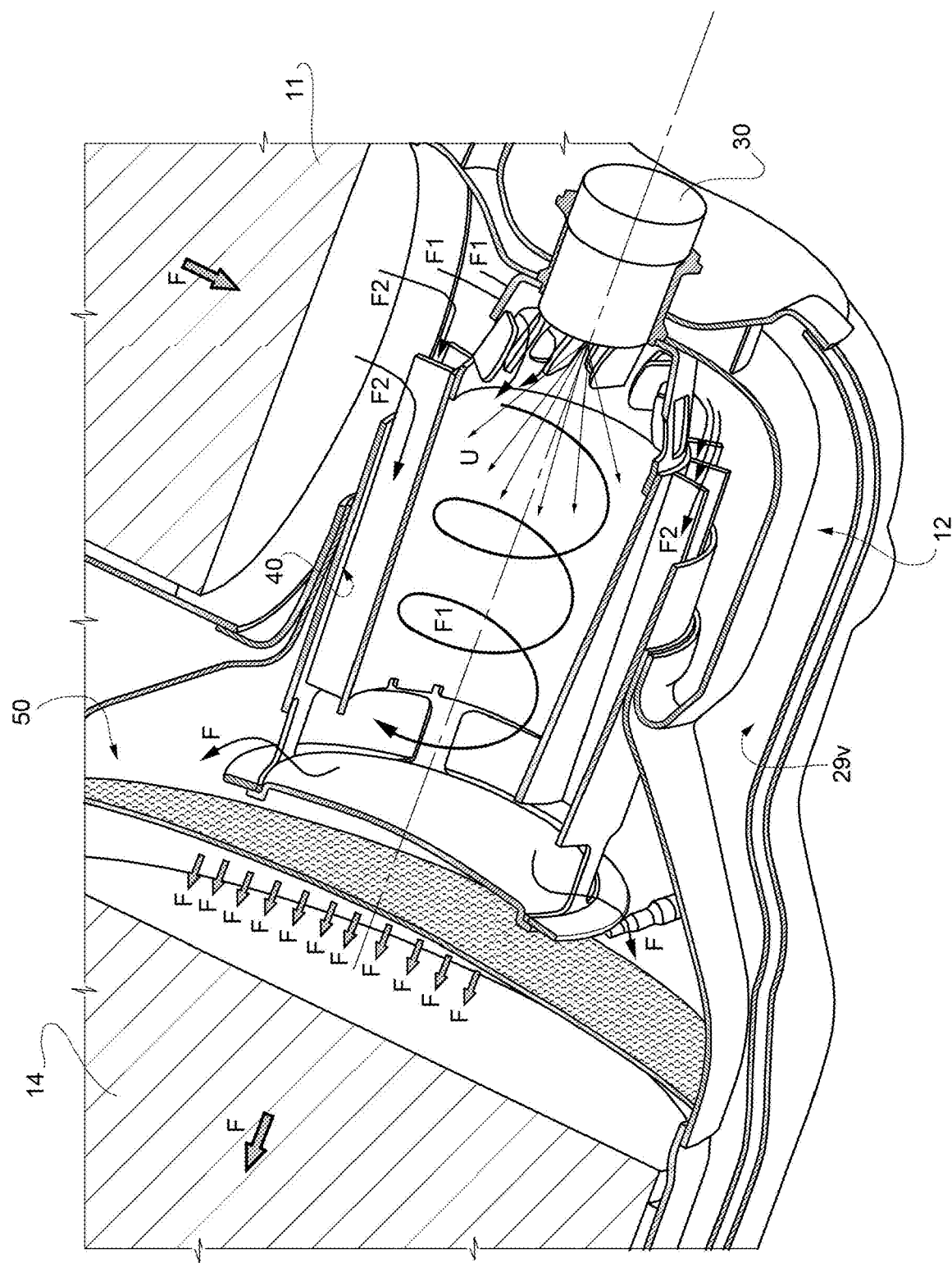
FIG. 4b is the perspective view of FIG. 4 in which paths of fluids flowing in said ATS portion are shown.

According to the preferred embodiment of FIGS. 4a, 4b terminal portion 48 comprises a plurality of openings 51 having preferably a rectangular shape and being each equally spaced circumferentially around axis A. Terminal plate 49 is a disc which is convex towards flows F1, F2, such convex shape helps flows F1, F2 to flow out through openings 51.

Figure 6C:
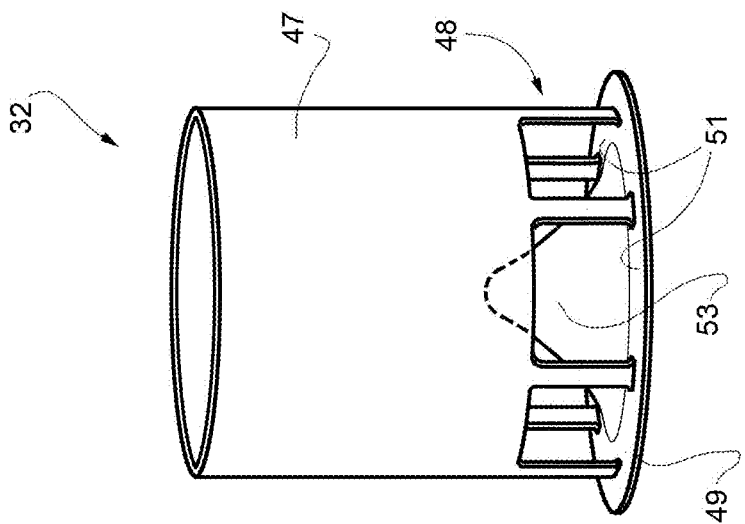
FIG. 6a, 6b and 6c are perspective views of different embodiments of a further element of the ATS of FIG. 3.
Figure 6B:
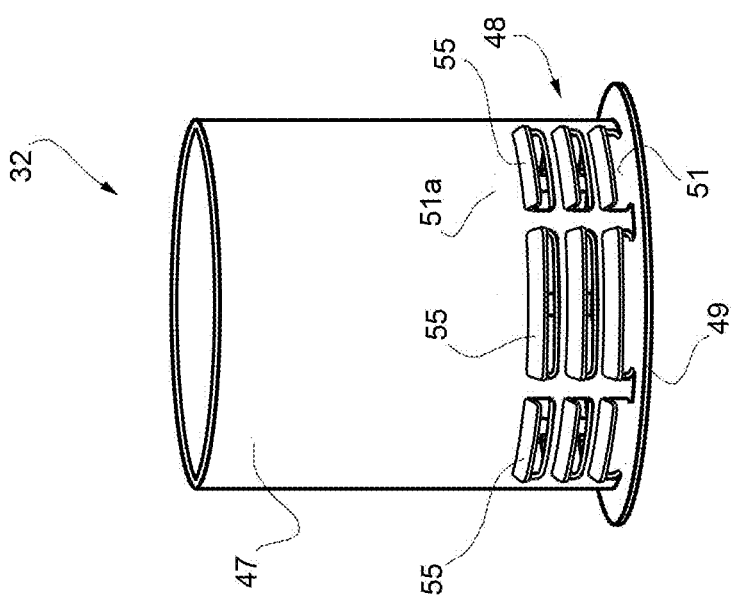
Figure 6A:
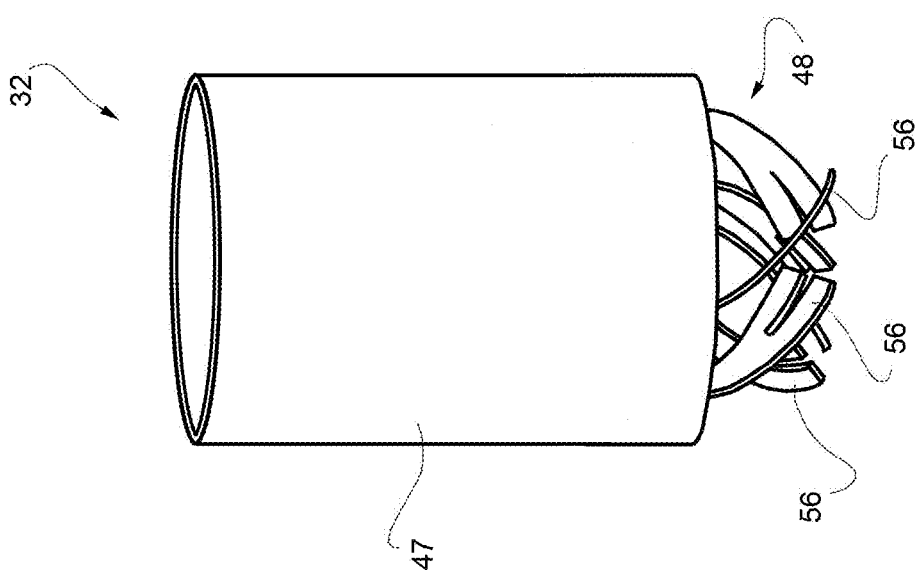

According to a first alternative embodiment, as disclosed in FIG. 6a, terminal plate 49 and openings 51 are absent and consequently outer element 32 is an annular cylinder open from bot extremities. However, outer element 32 comprises a plurality of mixing blades 56, carried by an extremity of terminal portion 48 and configured to impart a swirling movement to flows F1, F2 before their emission in mixing chamber 50.

According to a second alternative embodiment, as disclosed in FIG. 6b, terminal plate 49 is substantially the same of the embodiment of FIGS. 4a, 4b, while openings 51 are in greater number and, for example, are grouped in groups 51a of three rectangular openings 51, each group 51a being equally spaced circumferentially around axis A. Further, each opening 51 may further comprise a baffle 55, which may be substantially a wall extending towards mixing chamber 50 from one of edges of opening 51.

According to a third alternative embodiment, as disclosed in FIG. 6c, openings 51 are substantially the same of the embodiment of FIGS. 4a, 4b while terminal plate 49 comprises a protrusion 53 extending inside inner volume 38 of inner element 31 and having a concave external surface configured to help flows F1, F2 to flow out through openings 51.

Mixing chamber 50 is delimited by a duct 60, preferably a funnel shaped duct 60, which fluidly connects mixer 12 with catalysts module 13, in particular with SCRoF 14. Duct 60 comprises therefore an outlet 60b which is fitted with an inlet 14a of a supporting wall of SCRoF 14 and an inlet 60a which is mechanically coupled with fitting 21 and mixer 12. Duct 60 defines, between mixer 12 and SCRoF 14 a mixing chamber 50 having a volume lower than 2 liters.

ATS module 5 further comprises, preferably carried by duct 50, a second filter 61 fluidly interposed between mixer 12 and SCRoF 14 and configured to uniform flow F before entering in SCRoF 14.

The operation of the ATS module 5 according to the present invention is the following.

Exhaust gases flow F enters from inlet 7 and flows through first filter 18 and DOC 11. In DOC 11 first chemical reactions reduce particulates into water and carbon dioxide, as known.

Once passed through DOC 11, flow F enters into mixer 12 dividing into first flow F1, which passes through openings 35b and second flow F2, which passes in lateral volume 40 through heat exchanger 41.

Flow F2 provides heat to inner volume 38 by interacting with fans 42, while flow F1, entering in openings 35b acquires a swirl motion and receives an injection U of urea solution from dosing module 30. It has to be noted that injection of urea is substantially coaxial with axis A, which is consequently the axis around which swirl of flow Fl is generated. In this way urea is mixed in the part of inner volume 38 defined by cylindrical portion 34 of inner element 31, which is heated by flow F2, thereby avoiding formation of ammonia crystals. In particular, temperature of inner chamber 38 can be maintained at about the same temperature of the exhaust gases, even if urea solution which is injected into inner chamber 38 is at environment temperature, e.g. 25° C.

Once flowed for all length of element 31, flow F1 encounters terminal plate 49 which forces flow F1 to exit from openings 51 into mixing chamber 50. It has to be noted that a further mixing is achieved because flow F1 mix again with flow F2 coming from lateral volume 40.

From mixing chamber 50, mixture of urea and exhaust gases flows through second filter 61 and enters in catalysts module 13. Here, such mixture starts the reduction chemical reactions which transforms nitrogen oxide into nitrogen and water.

Once exit from catalysts module 13, purified gas flows through outlet 7 towards outlet tube 6.

The operation of the described alternative embodiments are equivalent to the above described one and therefore they will not be described for sake of brevity.

In particular, it has only to be noted that the different shapes of heat exchanger 41 described in embodiments according to FIGS. 5a-5d improve efficiency of heating of inner volume 38 and may be used in function of the typology of motor to which SCR module 5 is connected.

The presence of a protrusion 53 on terminal plate 49 according to embodiment of FIG. 6c improves the exit of flow F1 from openings 51; the presence of a plurality of openings 51 provided with a respective baffle 55 help mixing of flow F1 with flow F2; such effect may be similar achieved thanks to mixing blades 56 carried by an extremity of terminal portion 48.

In view of the foregoing, the advantages of an ATS according to the invention are apparent.

Thanks to the fact that the flow path of gases into ATS 9 is substantially squared, dimensions of ATS module 5 are reduced, and consequently it is obtained a reduction of encumbrance of the ATS module 5 in the vehicle.

Thanks to the fact that mechanical coupling between fittings and the relative ATS subsystem are reversible, ATS module 5 is modular since each ATS subsystem may be substituted, for a repair or improvement issue, without substantially modifying the global structure of ATS module 5.

The presence of an external housing 29 enclosing all the ATS 9 allows to avoid external elements, such as dirty elements or water, to interfere with duct of the ATS 9. Moreover, sensors 25 may be housed inside the volume 31 defined by housing 29, thereby increasing their performances and duration. Further, a thermal insulation material may be placed between ATS 9 and housing 29, avoiding at the same time loss of heat from ATS 9, which increases the efficiency of chemical reactions, and an excessive overheating of housing 29 which may be dangerous for the driver which is inspecting inside anterior portion 2 of cab 3.

An ATS comprising a urea mixer 12 which divide two flows F1, F2, one F1 in which an initial mix is generated and a second F2 for heating the first, increased the temperature of flow F1 thereby decreasing the possibility of formation of ammonia crystals, allowing an optimized mixing of exhaust gases with urea solution in a volume of small length. In this way, long linear mixing conduits are not necessary.

Moreover, the presence of a heat exchanger 41 through which flow F2 has to pass, increases the thermal exchange between flow F2 and F1.

Further, the presence of openings 35 together with plates 37 and/or curved fins 21 or mixing blades 56 or baffles 55, creates turbulences and/or swirl movements which increase the mixing of urea in flows F1 and, then joined, with flow F2. Such mixing allows to obtain a uniform distribution of the urea and temperature in the mixture with exhaust gases. This uniform temperature and mixture improve the efficiency of chemical reactions in SCR.

The presence of a terminal plate 49 avoid the direct impact of flow F1 with filter plate 61 or catalysts module 13; in this way a further mix in mixing chamber 50 is obtained and therefore the passage of mixture in filter plate 61 and catalysts module 13 has, as said, an uniform distribution of urea, which means also a uniform distribution of chemical reaction of the reagents of filter plate 61 and catalysts module 13 with consequently a uniform decay of their chemical properties in radial direction.

The presence of a convex surface of terminal plate 49 or of a protrusion 53 extending into volume 38 forces further the mixing of fluid F1 with flow F2.

The fact that the dosing module is a 5 bar dosing module allow to use an economic dosing modules; the fact that such dosing module is perpendicular to the flow decreases the probability of formation of ammonia crystals on walls of mixer and allow to obtain the above mentioned squared path with the consequent advantages.

Moreover, the use of a mixer which is not long, even if turbulences are present inside this latter, maintain an acceptable value of drop of pressure between inlet 7 and outlet 7 of ATS 9.

Finally, the use of mechanical metal sheet elements allows an easy manufacturing of such elements and mechanical reversible couplings between these elements allow a quick assembly of ATS 9.

It is clear that modifications can be made to the described ATS which do not extend beyond the scope of protection defined by the claims.

For example, the shapes of various elements (e.g. inner and outer elements 31, 32, the openings 35b, 51) may be varied, other elements may be present or not (filters 18, 60, or baffles 55. mixing blades 56 or fins 42, protuberances 53).

Ducts 21, 20, 7d, 8d may be connected to the respective elements in any other known way.

Finally, it is clear that the described embodiments may be combined together to provide embodiments which are not expressly described in the present application, without departing from the scope defined in the appended set of claims.

The invention claimed is:

1. An after treatment system for a vehicle comprises:
   an inlet fluidly connected to an output of an engine of the vehicle;
   an urea mixer comprising:
      a dosing module;
      an inner element that defines a first volume, the inner element comprising a heat exchanger connected to a lateral surface of the inner element and extending into the first volume, wherein the inner element is configured such that a first flow of exhaust gas flow flowing from the inlet into the urea mixer flows into the first volume; and
      an outer element, wherein a second volume is defined between the inner element and outer element, and wherein the outer element is configured such that a second flow of the exhaust gas flows in the second volume,
      wherein the first and second flows rejoin together in a mixing chamber fluidly connected to the second volume and to the first volume downstream with respect the inner and outer elements,
      wherein the heat exchanger comprises at least one fin extending in the second volume from the lateral surface of the inner element, the heat exchanger being configured to draw heat energy from the second flow flowing in the second volume to the first volume; and
   an outlet fluidly connectable to an outlet tube of the vehicle,
   wherein the inlet, urea mixer, and outlet are fluidly connected in series.

2. The after treatment system according to claim 1, wherein the first flow comprises between 35% and 45% of a total exhaust flow coming from the inlet into the urea mixer.

3. The after treatment system according to claim 1, wherein the at least one fin defines at least one channel, or chamber, in which the second flow is forced to flow.

4. The after treatment system according to claim 1, wherein the at least one fin is configured to impart a swirl to the second flow before its emission in the mixing chamber.

5. The after treatment system according to claim 1, further comprising a Diesel Oxidation Catalysts (DOC), wherein the inner element comprises at least one opening fluidly connected to the DOC and the first volume.

6. The after treatment system according to claim 5, wherein at least one edge of the at least one opening is provided with a protrusion configured to generate a swirl to the first flow flowing from DOC to first volume through the at least one opening.

7. The after treatment system according to claim 1, wherein the outer element comprises a terminal plate carried downstream with respect to the dosing module and configured to deviate flow radially out with respect to first volume.

8. The after treatment system according to claim 7, wherein the terminal plate has a convex surface.

9. The after treatment system according to claim 7, wherein the terminal plate comprises a protuberance extending into the first volume.

10. The after treatment system according to claim 1, wherein the outer element comprises, downstream with respect to the dosing module, at least one opening, the at least one opening being in fluidic communication with the mixing chamber, the first volume and the second volume, so as to allow the passage of the first flow and the second flow into the mixing chamber.

11. The after treatment system according to claim 10, wherein the at least one opening comprises at least one edge and a baffle on the at least one edge configured to deviate flow coming out from the at least one opening.

12. The after treatment system according to claim 1, wherein the outer element is cylindrical and it is placed coaxially around the inner element so as a terminal portion of the inner element is not radially interposed with respect the outer element and a terminal portion of the outer element is not radially interposed with respect the inner element.

13. The after treatment system according to claim 1, wherein the dosing module is perpendicular with respect to the flow flowing into the mixer from the inlet.

* * * * *